United States Patent Office 3,385,133
Patented May 28, 1968

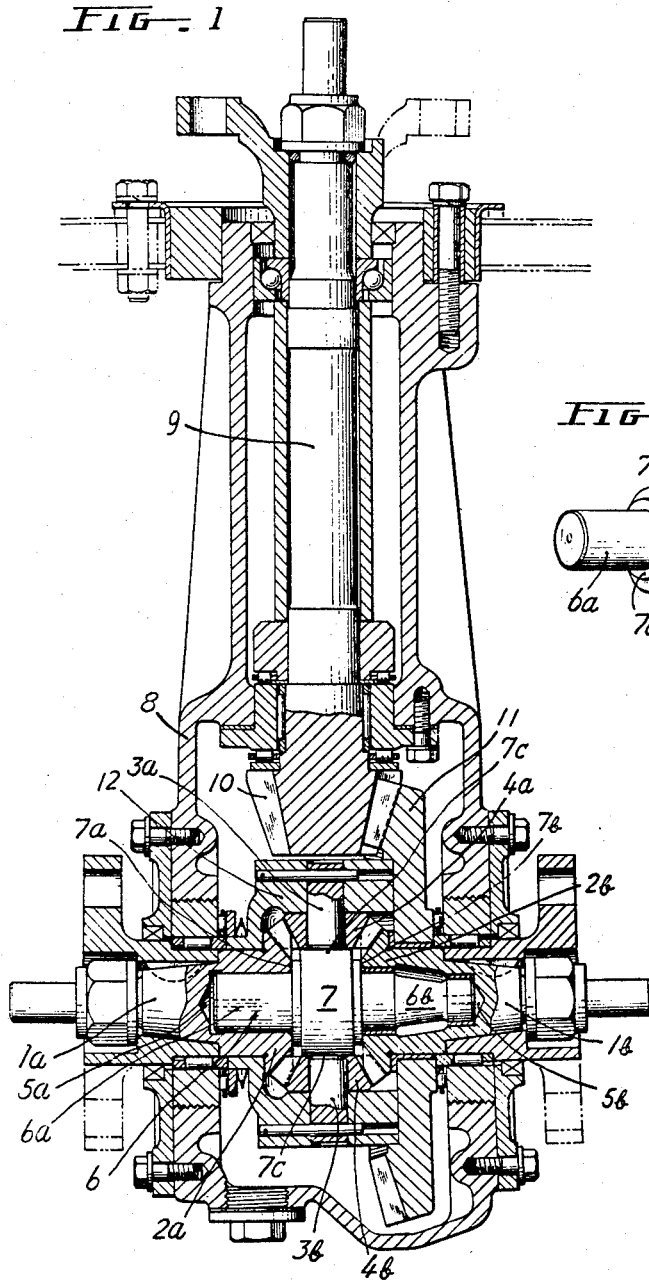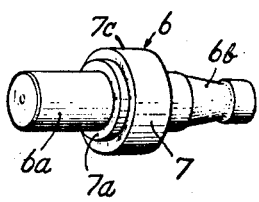

3,385,133
DIFFERENTIAL GEAR MECHANISM
Hiroshi Terao, Shizuoka-ken, Japan, assignor to Honda Giken Kogyo Kabushiki Kaisha, Chuo-ku, Tokyo, Japan
Filed Jan. 27, 1966, Ser. No. 523,390
Claims priority, application Japan, Sept. 30, 1965, 40/79,211
4 Claims. (Cl. 74—710)

ABSTRACT OF THE DISCLOSURE

A differential mechanism in which a core shaft has one end fixedly secured in an output shaft and an opposite end rotatably secured in the other output shaft, the core shaft having an integral cylindrical spacer thereon which contacts the end faces of the pinion gears and the end faces of the bevel gears.

---

The present invention relates to a differential gear mechanism of the type which is interposed between the propeller shaft and the driving wheels in a motor vehicle.

In a conventional differential gear mechanism of the above type there is employed a pair of separate output shafts with bevel gears thereon and a pair of differential pinion gears between the bevel gears and in mesh therewith. A frame or spider, which is externally driven by the propeller shaft, rotatably carries the pinion gears which drive the output shafts via said bevel gears and permit differential rotation between the output shafts as compensated by the rotation of the pinion gears in the frame.

The present invention relates to improvements in such differential gear mechanisms.

In this respect, the ends of the output shafts which support the bevel gears are free ends and therefore have a certain degree of relative flexibility. This adversely affects the meshing relation of the bevel gears and the pinion gears resulting in excessive wear and premature damage.

It is an object of the invention to overcome the above deficiency and more particularly to reinforce the ends of the output shafts to constrain the same to rotate about a common axis.

A further object of the invention is to hold the gears in fixed positions within the frame, so that they will always remain in perfect mesh.

The invention contemplates, according to an embodiment thereof, the use of a core shaft which is supported at its opposite ends in respective bores in the output shafts and wherein at least one of the ends of the core shafts is rotatable in its associated output shaft. This arrangement serves to reinforce the shafts while not affecting the differential action. Mounted centrally on the core shaft is a spacer which engages the pinion gears and bevel gears to maintain the same in fixed positions and in mesh with one another.

The spacer may be integral with the core shaft or it may be rotatable thereon.

Other objects and advantages of the invention will next become more apparent from the following consideration of an embodiment of the present invention as shown in the attached drawings, wherein:

FIGURE 1 is a sectional side view of differential gear mechanism employing an embodiment according to the present invention; and FIGURE 2 is a perspective view of the embodiment of the present invention as isolated from the differential gear mechanism.

The invention will next be described in conjunction with the attached drawing, wherein the differential gear mechanism operates in conventional manner and only the portion of which is necessary to completely understand the operation of the device according to the invention will be discussed.

In the drawing there is shown a differential gear arrangement wherein bevel gears 2a and 2b on respective shafts 1a and 1b are in mesh with differential pinion gears 4a and 4b on respective shafts 3a and 3b. Between the two shafts 1a and 1b there is mounted a core shaft 6 supported at its opposite ends 6a and 6b in respective axial bores 5a and 5b in said shafts 1a and 1b. At the middle portion of shaft 6 is mounted a spacer 7 inscribed within said gears 2a and 2b and said pinion gears 4a and 4b, whereby said spacer tends to maintain the gears 2a, 2b and the pinion gears 4a, 4b in position.

In the illustrated embodiment, the core shaft 6 is forcedly fitted in the bore 5a to be in fixed relation therein but is rotatably fitted in and supported by the other bore 5b. Thereby, the differential effect is retained between gears 2a, 2b and shafts 1a, 1b. The core shaft 6 may also be rotatably supported in the bore 5a.

In the illustrated example, the spacer 7 is formed by an integral enlargement at the middle portion of the core shaft 6. The spacer is formed with end surfaces 7a and 7b which abut the inner end surfaces of the gears 2a and 2b. The width of the peripheral surface 7c of the spacer 7 corresponds to the diameter of the inner end surfaces of the pinion gears 4a and 4b to engage the same as shown in FIG. 1. In a modification, the spacer 7 may be separate from the core shaft 6 and secured thereto. In such a case, the spacer 7 may be fixed to the shaft 6 by fastener means such as screws or the like, but it may also be rotatable thereon. This is achieved by allowing the spacer 7 to be loosely fitted on the shaft 6.

An outer casing 8 rotatably supports the shafts 1a and 1b at their outer end portions. An input shaft 9 extends through said casing 8 and supports a drive pinion 10 at its end. A bevel gear 11 is mounted loosely around shaft 1b and is in mesh with bevel gear 10 to be driven thereby. A carrying frame 12 rotatably supports the shafts 3a and 3b and is fixed to gear 11 for being rotated therewith. Thereby, the ordinary differential drive is obtained in which gear 10 drives gear 11 which in turn drives frame 12 and differential pinion gears 4a and 4b therewith. The gears 4a, 4b in turn drive the gears 2a and 2b and their supporting shafts 1a and 1b. The shafts 1a, 1b are capable of undergoing different speeds of rotation as compensated by the rotation of differential gears 4a, 4b in frame 12.

According to the present invention the core shaft 6 gives effective reinforcement to the two shafts 1a and 1b, while the spacer 7 at the middle portion of shaft 6 can serve to position the gears 2a and 2b and the differential gears 4a and 4b without permitting any derangement of their meshing conditions, whereby the operation of the differential drive apparatus can be always kept smooth and accurate. Moreover, the construction of the core and spacer is extremely simple and because of its positioning function for the gears lowers the manufacturing cost of the differential mechanism.

From the above, it will be readily apparent that the core shaft 6 serves as a reinforcement means for the output shafts 1a, 1b, by reason of its support in the bores 5a, 5b therein. The spacer 7 constitutes spacer means for engaging the bevel gears 2a, 2b, at their end faces, by surfaces 7a, 7b, while engaging pinion gears 4a, 4b, by its peripheral surface 7c, to hold the gears in fixed positions and in mesh.

Numerous modifications and variations of the disclosed invention will become apparent to those skilled in the art

What is claimed is:

1. In a differential mechanism having a pair of separate output shafts with bevel gears thereon in spaced relation and a pinion gear between the bevel gears and in mesh therewith, an improvement comprising means supported by said shafts and furnishing reinforcement therefor and means on the first said means engaging the pinion gears and bevel gears to hold the same in fixed positions and in mesh, said means supported by said shafts comprising a core shaft in axial alignment with the output shafts and having opposite ends respectively supported in said output shafts, one of said ends of the core shaft being rotatable in the associated output shaft, the other of said ends of the core shaft being fixedly supported in the associated output shaft, said means engaging the pinion gear and bevel gears comprising a cylindrical spacer integrally mounted centrally and coaxially on the core shaft, said spacer including end portions contacting the end faces of respective bevel gears, said spacer having a peripheral surface contacting the end face of said pinion gear, said spacer having a length corresponding to the diameter of the end face of the pinion gear to fully support the latter, the end portions having a diameter corresponding to the diameter of the end faces of the bevel gears.

2. A mechanism as claimed in claim 1, wherein a shaft supports said pinion gear and has an end recessed in said pinion gear to insure that the peripheral surface of the spacer only contacts the end face of the pinion gear.

3. In a mechanism as claimed in claim 1, wherein the end of the core shaft which is rotatably supported in the associated shaft comprises first and second spaced portions supported rotatably in the associated output shaft and a conical tapered portion between said spaced portions and out of contact with the interior of the associated output shaft.

4. In a mechanism as claimed in claim 3, wherein the differential mechanism is provided with a frame and the output shafts are supported for rotation in said frame, the rotatably supported portion of the end of the core shaft which is furthest from the cylindrical spacer being aligned with the rotatable support of the associated output shaft in the frame.

References Cited

UNITED STATES PATENTS

| | | | |
|---|---|---|---|
| 94,844 | 9/1869 | Salisbury | 74—713 |
| 353,794 | 12/1886 | Lloyd et al. | 74—713 |
| 571,187 | 11/1896 | Burton | 74—713 |
| 741,931 | 10/1903 | Sandell | 74—713 |
| 1,164,870 | 12/1915 | Rosenberg | 74—713 |
| 1,315,217 | 9/1919 | Eason et al. | 74—713 |
| 1,780,281 | 11/1930 | Tibbetts | 74—713 |
| 2,720,797 | 10/1955 | Huddleston et al. | 74—713 |

FOREIGN PATENTS

| | | |
|---|---|---|
| 957,446 | 1/1957 | Germany. |

FRED C. MATTERN, Jr., *Primary Examiner.*

THOMAS C. PERRY, *Examiner.*